(12) United States Patent
Chelaidite

(10) Patent No.: US 11,554,766 B2
(45) Date of Patent: Jan. 17, 2023

(54) HYDRAULICALLY ASSISTED ELECTRIC PARKING BRAKE

(71) Applicant: ZF Active Safety US Inc., Livonia, MI (US)

(72) Inventor: Gaius Chelaidite, South Lyon, MI (US)

(73) Assignee: ZF Active Safety US Inc., Livonia, MI (US)

(*) Notice: Subject to any disclaimer, the term of this patent is extended or adjusted under 35 U.S.C. 154(b) by 119 days.

(21) Appl. No.: 17/203,861

(22) Filed: Mar. 17, 2021

(65) Prior Publication Data
US 2022/0297654 A1 Sep. 22, 2022

(51) Int. Cl.
| | | |
|---|---|---|
| *B60T 13/00* | (2006.01) | |
| *B60T 13/66* | (2006.01) | |
| *F16D 65/18* | (2006.01) | |
| *F16D 55/226* | (2006.01) | |
| *F16D 121/24* | (2012.01) | |
| *F16D 125/40* | (2012.01) | |
| *F16D 125/06* | (2012.01) | |

(52) U.S. Cl.
CPC ............ *B60T 13/66* (2013.01); *F16D 55/226* (2013.01); *F16D 65/18* (2013.01); *F16D 2121/24* (2013.01); *F16D 2125/06* (2013.01); *F16D 2125/40* (2013.01)

(58) Field of Classification Search
CPC ...... B60T 13/741; F16D 55/226; F16D 65/18; F16D 2121/24; F16D 2125/06; F16D 2125/40
See application file for complete search history.

(56) References Cited

U.S. PATENT DOCUMENTS

| | | | |
|---|---|---|---|
| 11,131,354 B1* | 9/2021 | Gerber | ............... F16D 65/56 |
| 2014/0090934 A1* | 4/2014 | Pritz | ............... F16D 65/567 |
| | | | 188/72.4 |
| 2017/0130788 A1 | 5/2017 | Noguchi et al. | |

(Continued)

FOREIGN PATENT DOCUMENTS

| | | |
|---|---|---|
| DE | 19804426 A1 | 7/1999 |
| DE | 102006029942 A1 | 8/2007 |

(Continued)

OTHER PUBLICATIONS

German Search Report for corresponding German Application Serial No. 10 2022 202 070.7, dated Nov. 2, 2022, pp. 1-10.

*Primary Examiner* — Nicholas J Lane
(74) *Attorney, Agent, or Firm* — Robert James Harwood

(57) ABSTRACT

A hydraulic vehicle brake includes a housing and first and second brake pistons at least partially located within the housing. The brake pistons are configured to cooperatively press a common friction pad against a rotor of the vehicle brake. Each of the pistons is a hollow piston including a substantially solid piston bottom. A clamp beam laterally spans the piston bottoms of the first and second pistons within the housing. The clamp beam is configured to selectively apply longitudinally directed clamping force upon the pistons. A spindle is selectively driven for rotational motion by an electric motor. The spindle is interposed laterally between the first and second brake pistons within the housing. The spindle is configured to reciprocate the clamp beam longitudinally within the housing responsive to a direction of the rotational motion.

12 Claims, 3 Drawing Sheets

(56) References Cited

U.S. PATENT DOCUMENTS

| | | | |
|---|---|---|---|
| 2020/0256411 A1 | 8/2020 | Willey et al. | |
| 2021/0222746 A1* | 7/2021 | Tarandek | F16D 55/2262 |
| 2021/0310530 A1* | 10/2021 | Tarandek | F16D 65/18 |
| 2022/0297660 A1* | 9/2022 | Lim | F16D 55/02 |

FOREIGN PATENT DOCUMENTS

| | | |
|---|---|---|
| DE | 102009013005 B3 | 8/2010 |
| DE | 102011103823 A1 | 12/2012 |

\* cited by examiner

HYDRAULICALLY ASSISTED ELECTRIC PARKING BRAKE

TECHNICAL FIELD

This disclosure relates to an apparatus and method for use of a brake and, more particularly, to a hydraulically assisted electric parking brake having a plurality of pistons.

BACKGROUND

A hydraulic vehicle brake includes a friction pad which can be pressed against a brake disk by at least one brake piston using hydraulic fluid, in order to brake rotation of the brake disk (which is rigidly attached to a corresponding vehicle wheel). To operate the brake, hydraulic fluid is fed under pressure into a hydraulic chamber, a boundary wall of which is formed by the brake piston. The pressure in the hydraulic chamber then leads to a displacement of the brake piston, and thus of the friction pad, towards the brake disk.

SUMMARY

In an aspect, a hydraulic vehicle brake is described. The hydraulic vehicle brake includes a housing and first and second brake pistons at least partially located within the housing. The first and second brake pistons are configured to cooperatively press a common friction pad against a rotor of the vehicle brake. Each of the first and second pistons is a hollow piston including a substantially solid piston bottom, an open piston rim located proximate the friction pad, and a piston body longitudinally interposed between the piston bottom and the piston rim. A clamp beam laterally spans the piston bottoms of the first and second pistons within the housing. The clamp beam is configured to selectively apply longitudinally directed clamping force upon the first and second pistons. A spindle is selectively driven for rotational motion by an electric motor. The spindle is interposed laterally between the first and second brake pistons within the housing. The spindle is configured to reciprocate the clamp beam longitudinally within the housing responsive to a direction of the rotational motion.

BRIEF DESCRIPTION OF THE DRAWINGS

For a better understanding, reference may be made to the accompanying drawings, in which.

DESCRIPTION OF ASPECTS OF THE DISCLOSURE

The invention comprises, consists of, or consists essentially of the following features, in any combination.

Figure 1:
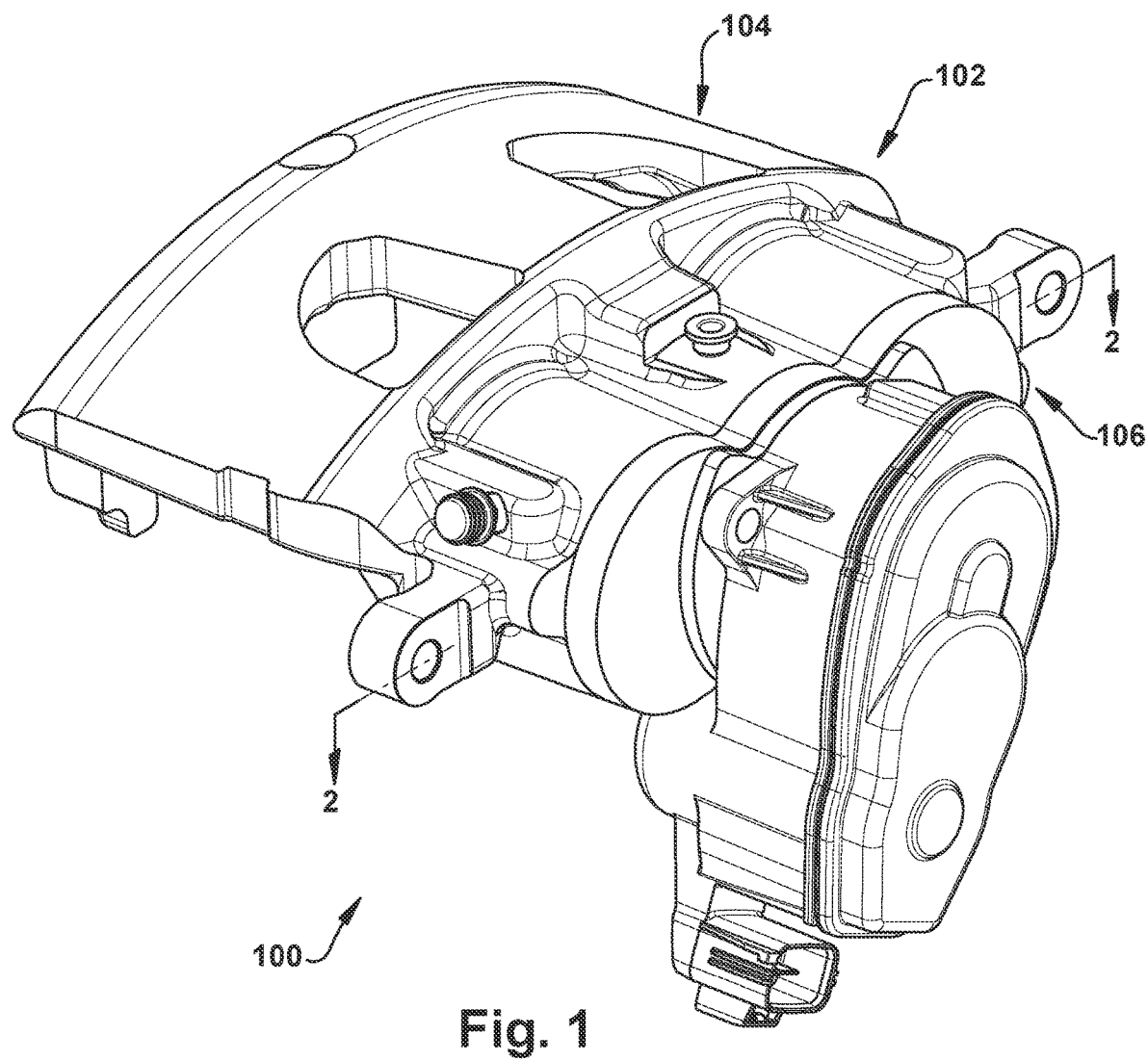
FIG. 1 is a schematic perspective front view of an aspect of the present invention.

FIG. 1 depicts a hydraulic vehicle brake 100 including a housing 102. The housing 102 may be of a multi-piece variety, including, for example, a caliper housing 104 and an end cap 106, as shown in FIG. 1.

Figure 2:
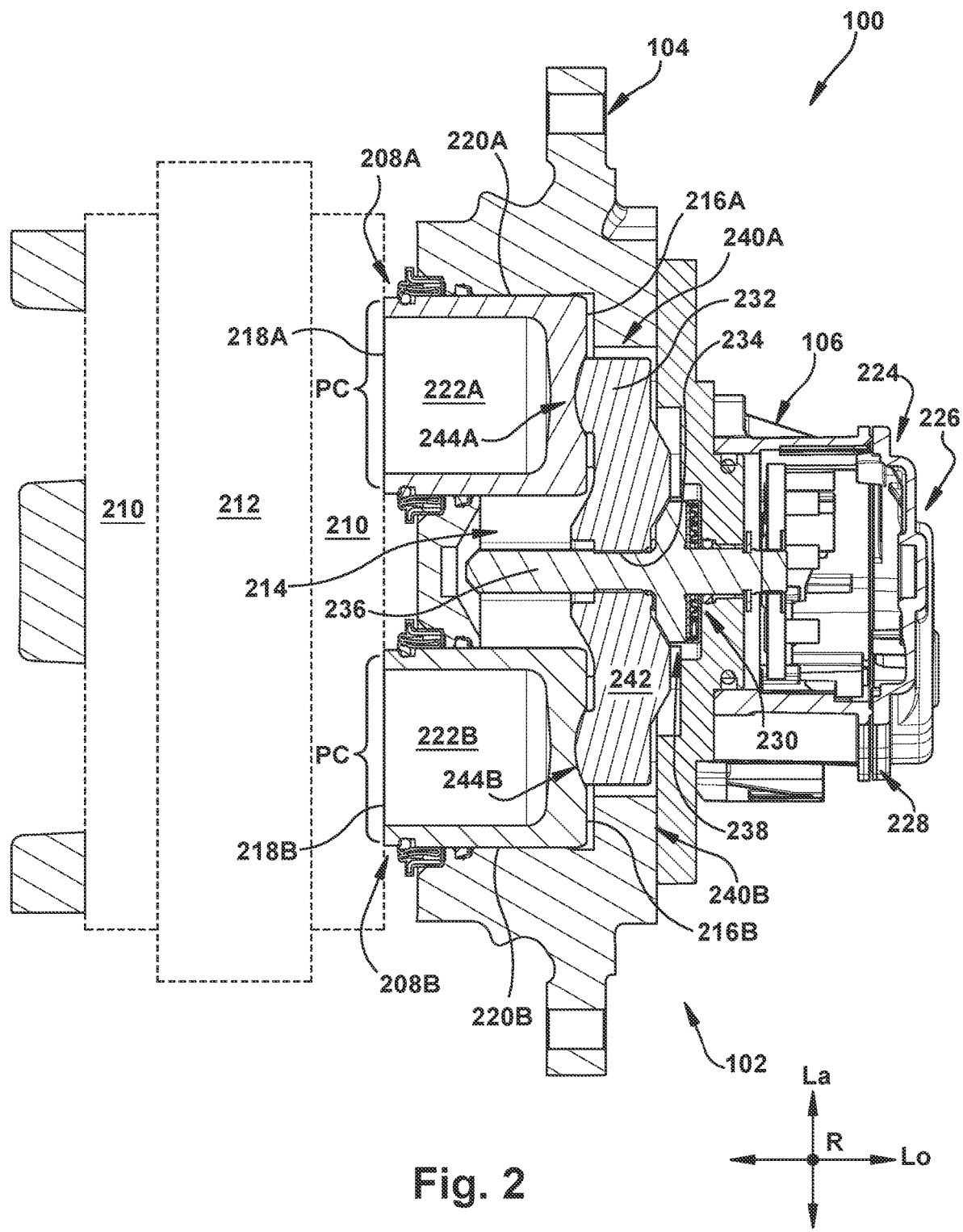
FIG. 2 is a cross-sectional view taken along line "2-2" of FIG. 1.

Turning to FIG. 2, first and second brake pistons 208A and 208B are each at least partially located within the housing 102. The first and second pistons 208A and 208B are configured to cooperatively press a common friction pad 210 against a rotor 212 of the vehicle brake responsive to hydraulic pressure within a hydraulic chamber (indicated generally by 214) associated with the first and second brake pistons 208A and 208B during a normal service brake event. The friction pad 210 may be, for example, a brake pad, such as a "banana" shaped pad. In some use applications, it may be desirable to spread force from the brake 100 across a large area of the friction of member 210. As a result, the first and second pistons 208A and 208B could be configured to interface the friction pad number 210 at laterally spaced piston contact locations, which are indicated generally at "PC", in FIG. 2. The term "lateral" is used herein to reference a direction substantially parallel to the lateral axis "La", which is the vertical direction, in the orientation of FIG. 2. (For some configurations of the brake 100, the lateral direction will be substantially parallel to a brake rotor 212.)

Each of the first and second pistons 208A and 208B may be a "cup"-type piston including a substantially solid piston bottom 216A and 216B and an open piston rim 218A and 218B located proximate the friction pad 210 for direct or indirect engagement therewith. A piston body 220A and 220B is longitudinally interposed between the piston bottom 216A and 216B and the piston rim 218A and 218B of each of the first and second pistons 208A and 208B. The "longitudinal" direction, as referenced herein and depicted as axis "Lo" and sometimes called the "axial direction" in brake design, is substantially perpendicular to the lateral direction, and is the horizontal direction, in the orientation of FIG. 2, and may be referenced as the "axial" direction, in some use environments. The piston body 220A and 220B is substantially shaped as a right cylinder in the embodiment shown in the Figures, but may have any desired shape for a particular use environment of the present invention.

An inner volume 222A and 222B is defined for each piston 208A and 208B at least partially by the piston body 220A and 220B and the piston bottom 216A and 216B. The inner volumes 222A and 222B of the hollow first and second pistons 208A and 208B are fluidically separated from the hydraulic fluid within the hydraulic chamber 214.

Stated differently, the hollow pistons 208A and 208B of the brake 100 are "reversed", as compared to prior art electric parking brake devices. As a result, less hydraulic fluid is needed to "fill" the hydraulic chamber 214 than in those prior art electric parking brake devices, because the inner volumes 222A and 222B are devoid of hydraulic fluid that would be needed if the hollow pistons 208A and 208B were reversed and to end, in the longitudinal direction, from the brake 100 depicted in the Figures.

An electric motor 224 may be at least partially located adjacent the housing 102. For some use environments of the brake 100, a motor gear unit 226 may be provided. When present, such a motor gear unit 226 may include the electric motor 224 and a ratio-change gearset 228. The motor gear unit 226 could be readily installed, as shown in the Figures, by placement outside the housing 102 and connection to already-assembled components located inside the housing 102, comprising the caliper housing 104 and the end cap 106. (It is also contemplated that the motor gear unit 226 could at least be partially located within the housing 102, and/or a housing of the motor gear unit 226 could be integrated into the overall housing 102 of the brake 100, along with the caliper housing 104 and the end cap 106). Such a "modular" arrangement of the brake 100 could be helpful in facilitating both original manufacture and later repair.

A spindle 230 is selectively driven for rotational motion by the electric motor 224. The spindle 230 may be interposed laterally between the first and second brake pistons 208A and 208B within the housing 102. The ratio-change gearset 228, when present, may be mechanically interposed between the electric motor 224 and the spindle 230.

A clamp beam 232 laterally spans at least a portion of the piston bottoms 216A and 216B of the first and second pistons 208A and 208B within the housing 102. The clamp beam 232 is configured to selectively apply longitudinally directed clamping force upon the first and second pistons 208A and 208B. The spindle 230 is configured to reciprocate the clamp beam 232 longitudinally within the housing 102 responsive to a direction of the rotational motion of the spindle 230, as driven by the electric motor 224, either directly or indirectly (e.g., via an interposed motor gear unit 226). For example, clockwise rotation of the spindle 230 (as viewed from the direction of the end cap 106, or right toward left, in the orientation of FIG. 2) could drive the clamp beam 232 longitudinally away from the friction pad 210, while counterclockwise motion of the spindle 230 could drive the clamp beam 232 longitudinally toward the friction pad 210.

The clamp beam 232 could be associated with the spindle 230 in any desirable manner to accomplish the reciprocal motion, in one or both longitudinal directions, as described above. For example, the clamp beam 232 could be directly or indirectly threadably engage with the spindle 230 to be driven thereby, under the aforementioned rotational force. As other examples, the clamp beam 232 could "carry" the spindle 230 within a ball nut, and/or using an axle-type bearing arrangement without threadable engagement therebetween. The clamp beam 232 may include a spindle bore 234 extending longitudinally therethrough for accepting a spindle body 236 of the spindle 230 thereinto.

When the clamp beam 232 is directly or indirectly threadably engaged with the spindle 230, a predetermined amount of thread clearance may be permitted therebetween. (I.e., the threadable engagement may be sufficient to allow driving of the clamp beam 232, but could be of a "loose" fit, allowing some relative lateral motion between the components, which does not rise to the level of allowing disengagement of the spindle 230 from the clamp beam 232 during driving of the clamp beam 232.) The thread clearance, when present, may be selected to permit a predetermined rotation or "rocking" of the clamp beam 232 about a rocking axis "R" substantially perpendicular to the spindle 230 (rocking axis R is shown as extending into and out of the plane of the page, in FIG. 2, and perpendicular to both the lateral and longitudinal axes). That is, the clamp beam 232 could move in a "seesaw" type manner with respect to the spindle 230, as the clamp beam 232 reciprocates longitudinally back and forth within the housing 102. In many use environments, this rocking of the clamp beam 232 will result in the transmission of a substantially equal pressure/load to the first and second pistons 208A and 208B during reciprocal motion of the clamp beam 232 (the rocking compensates, e.g., for structural mismatches between the first and second pistons 208A and 208B during equal load application). It is also contemplated that the brake 100 could be configured as desired for particular use applications wherein differential load is intentionally applies to the first and second pistons 208A and 208B via the clamp beam 232.

A spindle nut 238 may be threadably engaged with the spindle 230 adjacent the clamp beam 232 to prevent longitudinal motion of the clamp beam 232 with respect to the spindle 230. When the spindle nut 238 is present, the clamp beam 232 may be longitudinally interposed between the spindle nut 238 and the first and second pistons 208A and 208B. The spindle nut 238 may assist with facilitating the thread clearance by allowing the clamp beam 232 to rotate about rocking axis R with a larger arc of travel than if the clamp beam 232 were to itself be threadably engaged with the spindle 230.

As depicted in the Figures, the clamp beam 232 has first and second beam ends 240A and 240B longitudinally separated by a beam body 242. Each of the first and second beam ends 240A and 240B is longitudinally proximate at least a portion of the piston bottom 216A and 216B of a corresponding one of the first and second pistons 208A and 208B, with the beam body 242 spanning a lateral space within the housing 102 which separates the first and second pistons 208A and 208B.

At least one piston bottom 216A and 216B may include a bottom depression 244A and 244B with, for example, a concave spherical dome-type shape. Particularly, though not always, when this is the case, at least one of the first and second beam ends 240A and 240B includes a longitudinally convex spherical dome shape. When present, the dome-shaped, protruding beam end 240A and 240B may be selectively engaged with a corresponding recessed bottom depression 244A and 244B of the piston bottom 216A and 216B of the corresponding one of the first and second pistons 208A and 208B. These spherical, or otherwise rounded, surfaces of the bottom depressions 244A and 244B and the beam ends 240A and 240B may facilitate application of force between the clamp beam 232 and the piston bottom 216A and 216B during "rocking" or rotation of the spindle 230 about the rocking axis R, as well as guiding and spreading the force between the spherical surfaces over a greater application area than in a flat-to-point or flat-to-dome contact. It is contemplated that the convexity and concavity of the bottom depressions 244A and 244B and the beam ends 240A and 240B may be reversed from that shown in the Figures, or that one of the bottom depressions 244A and 244B and the beam ends 240A and 240B could have a convex or concave surface, for engagement with a substantially flat other one of the bottom depressions 244A and 244B (in that case, just the piston bottom 216A and 216B, with no depression) and the beam ends 240A and 240B. Though a spherical surface is shown and described herein, it is also contemplated that one or both of the bottom depressions 244A and 244B and the beam ends 240A and 240B could have any desired shape or profile, such as, but not limited to, curved, curvilinear, oval, linear, or any combination thereof, and may be provided for any purpose such as, but not limited to, reducing contact stress between the clamp beam 232 and the piston bottom 216A and 216B under heavy loads (e.g., near the designed-for maximum load).

Figure 3A:
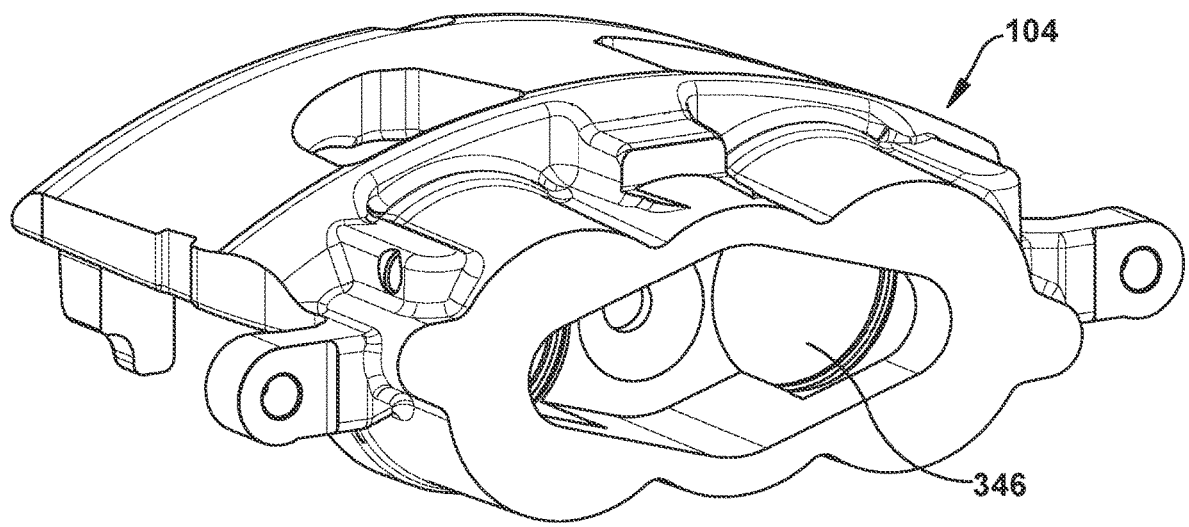
FIG. 3A is a schematic perspective side view of a component of the aspect of FIG. 1.
Figure 3B:
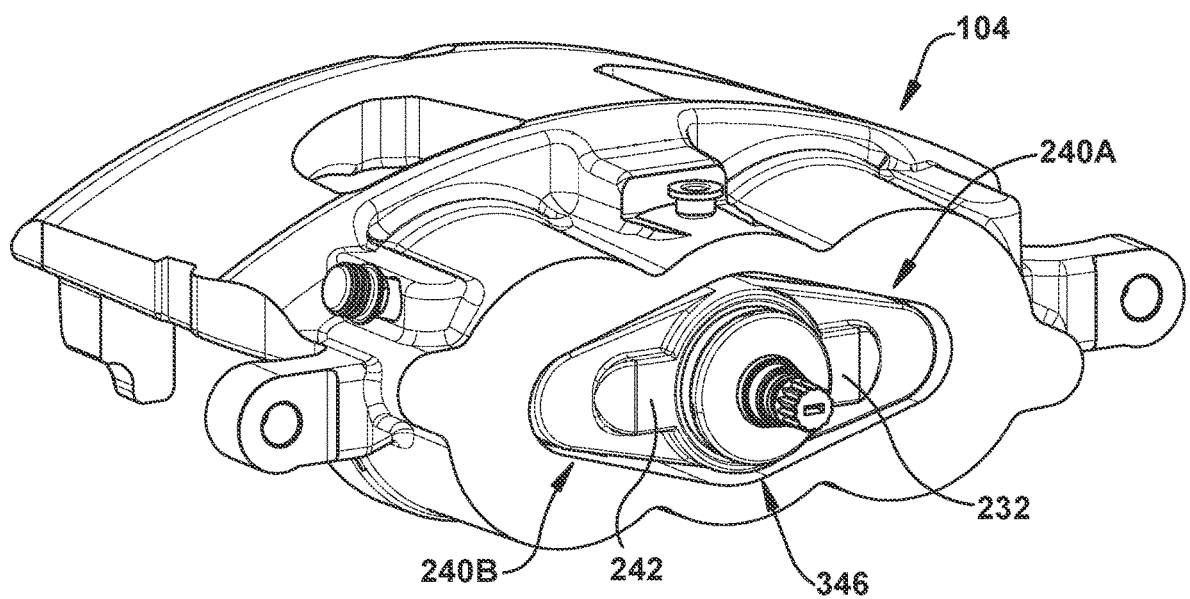
FIG. 3B is a schematic partial view of the component of FIG. 3A.

With reference now to FIGS. 3A-3B, the housing 102, or a portion thereof, may include an elongate housing slot 346 for laterally accepting at least a portion of the clamp beam 232 thereinto to resist rotational forces exerted upon the clamp beam 232 by rotational motion of the spindle 230. (When the clamp beam 232 is engaged with the piston bottoms 216A and 216B, that contact may also help to resist rotation of the clamp beam 232 along with the spindle 230.) Stated differently, at least a portion of the clamp beam 232 can be inserted into the housing slot 346 so that the clamp beam 232 is constrained to move substantially longitudinally during operation of the brake 100, and not rotate about the spindle 230. In FIGS. 3A-3B, the caliper housing 104 is shown with the end cap 106 removed, but one of ordinary skill in the art will be readily able to provide a housing 102 arrangement for any desired configuration of the brake 100 including, but not limited to, a housing slot 346 formed in a plate or other secondary structure (not shown) which does not itself form a wall of the housing 102 or a portion thereof. The end cap 106 may at least partially enclose the clamp beam 232, in combination with the caliper housing 104, and may be configured to prevent hydraulic fluid leaks from the housing 102.

It is contemplated that the portion of the housing 102 which forms the housing slot 346 will be thick enough, in the longitudinal direction, to still at least partially enclose and constrain from rotation the clamp beam 232, even when the clamp beam 232 reciprocates longitudinally during normal operation of the brake 100.

As shown in FIG. 3B, the beam body 242 includes a "thicker" or larger-footprint central portion, surrounding the spindle 230, with narrower beam ends 240A and 240B extending outward from that central portion in a cantilevered manner. This construction, when present, may be helpful in facilitating assembly of the system and/or robust transfer of forces between the spindle 230, the clamp beam 232 and the two pistons.

During operation of the brake 100, and particularly for use of the brake 100 as a parking brake, the electric motor 224 is controlled in any suitable manner to rotate the spindle 230 and the clamp beam 232 responsively moves towards the brake rotor 212 to push the first and second pistons 208A and 208B into engagement with the friction pad 210. The clamp beam 232 spreads the brake application force across the first and second pistons 208A and 208B and the clamp beam 232 may be permitted to rock slightly upon the spindle 230 during application to compensate for uneven wear of the friction pad 210, minor dimensional mismatches of the first and second pistons 208A and 208B, or for any other reason. Such rocking or rotation of the clamp beam 232 with respect to the spindle 230 may be facilitated by a thread clearance and/or rounded-surface contact between the bottom depressions 244A and 244B and the beam ends 240A and 240B. The clamp beam 232 may spread the brake application force substantially evenly/equally across the first and second pistons 208A and 208B, or may be configured to "weight" one piston more heavily than the other, when desired, as previously mentioned. It is contemplated that the "see saw" type rocking motion of the clamp beam 232 could facilitate protrusion of one of the first and second pistons 208A and 208B further toward the friction pad 210 than the other, which may be helpful in applying force in a desired fashion even if the friction pad 210 is tapered or unevenly worn.

When desired engagement between the first and second pistons 208A and 208B and the friction pad 210 has been achieved, the electric motor 224 can be controlled to cease rotation of the spindle 230, thus "blocking" this desired engagement into place. (This "blocking" could be facilitated by direct or indirect threaded engagement between the clamp beam 232 and the spindle 230, when the threads are configured to resist "backing out" that would release the clamp beam 232 undesirably.) The electric motor 224 could even be switched off, for long-term maintenance of the "blocked" condition (i.e., "actuation" of the brake 100) during, for example, a parked duration of the vehicle for which the brake 100 is provided.

When the brake 100 is then desired to be released or deactivated, power is provided to the electric motor 224, which is controlled to rotate the spindle 230 in a predetermined direction. The clamp beam 232 then moves, responsive to rotation of the spindle 230, away from the first and second pistons 208A and 208B. The first and second pistons 208A and 208B are then relieved the pressure and can subsequently return to a position in which they no longer engage the friction pad 210. This is considered a "deactuated" or "released" condition for the brake 100.

Unless defined otherwise, all technical and scientific terms used herein have the same meaning as is commonly understood by one of ordinary skill in the art to which the present disclosure pertains.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A hydraulic vehicle brake, comprising:
a housing;
first and second brake pistons at least partially located within the housing, the first and second brake pistons being configured to cooperatively press a common friction pad against a rotor of the vehicle brake, each of the first and second pistons being a hollow piston including a substantially solid piston bottom, an open piston rim located proximate the friction pad, and a piston body longitudinally interposed between the piston bottom and the piston rim;
a clamp beam laterally spanning the piston bottoms of the first and second pistons within the housing, the clamp beam being configured to selectively apply longitudinally directed clamping force upon the first and second pistons; and
a spindle selectively driven for rotational motion by an electric motor, the spindle being interposed laterally between the first and second brake pistons within the housing, and the spindle being configured to reciprocate the clamp beam longitudinally within the housing responsive to a direction of the rotational motion.

2. The hydraulic vehicle brake of claim 1, wherein the clamp beam is threadably engaged with the spindle to be driven thereby, under rotation of the spindle by the electric motor.

3. The hydraulic vehicle brake of claim 2, wherein the clamp beam is threadably engaged with the spindle with a predetermined amount of thread clearance therebetween, the thread clearance being selected to permit a predetermined rotation of the clamp beam about a rocking axis substantially perpendicular to the spindle.

4. The hydraulic vehicle brake of claim 1, wherein inner volumes of the hollow first and second pistons are fluidically separated from hydraulic fluid within the housing.

5. The hydraulic vehicle brake of claim 1, including the electric motor, being at least partially located adjacent the housing.

6. The hydraulic vehicle brake of claim 1, including a motor gear unit comprising the electric motor and a ratio-change gearset mechanically interposed between the electric motor and the spindle.

7. The hydraulic vehicle brake of claim 1, wherein the housing includes an elongated housing slot for laterally accepting at least a portion of the clamp beam thereinto to resist rotational forces exerted upon the clamp beam by rotational motion of the spindle.

8. The hydraulic vehicle brake of claim 1, wherein the housing includes a caliper housing and an end cap, the caliper housing including an elongate housing slot for laterally accepting at least a portion of the clamp beam thereinto to resist rotational forces exerted upon the clamp beam by rotational motion of the spindle, and the end cap enclosing the clamp beam, cooperatively with the caliper housing.

9. The hydraulic vehicle brake of claim 1, wherein the clamp beam includes a spindle bore extending longitudinally therethrough for accepting a spindle body of the spindle, and a spindle nut is threadably engaged with the spindle adjacent the clamp beam to prevent longitudinal motion of the clamp beam with respect to the spindle, with the clamp beam longitudinally interposed between the spindle nut and the first and second pistons.

10. The hydraulic vehicle brake of claim 1, wherein at least one piston bottom includes a bottom depression with a concave spherical dome shape.

11. The hydraulic vehicle brake of claim 10, wherein the clamp beam has first and second beam ends longitudinally separated by a beam body, each of the first and second beam ends being longitudinally proximate at least a portion of the piston bottom of a corresponding one of the first and second pistons, at least one of the first and second beam ends including a longitudinally convex spherical dome shape for selective engagement with a corresponding bottom depression of the piston bottom of the corresponding one of the first and second pistons.

12. The hydraulic vehicle brake of claim 1, wherein the first and second pistons interface the friction pad at laterally spaced piston contact locations.

* * * * *